March 3, 1959 P. ZERNOV Re. 24,615

BLANK COUNTING MECHANISM

Original Filed Sept. 21, 1953 4 Sheets-Sheet 1

INVENTOR.
Peter Zernov
BY
Lieber, Lieber & Nilles
Atty's.

BLANK COUNTING MECHANISM

Original Filed Sept. 21, 1953 4 Sheets-Sheet 2

INVENTOR.
Peter Zernov
BY
Lieber, Lieber & Nilles
Atty's.

March 3, 1959 P. ZERNOV Re. 24,615

BLANK COUNTING MECHANISM

Original Filed Sept. 21, 1953 4 Sheets-Sheet 3

INVENTOR.
Peter Zernov
BY
Lieber, Lieber & Nilles
Atty's.

March 3, 1959 P. ZERNOV Re. 24,615

BLANK COUNTING MECHANISM

Original Filed Sept. 21, 1953 4 Sheets-Sheet 4

INVENTOR.
Peter Zernov
BY
Lieber, Lieber & Nilles
Atty's

United States Patent Office

Re. 24,615
Reissued Mar. 3, 1959

24,615

BLANK COUNTING MECHANISM

Peter Zernov, Milwaukee, Wis., assignor to Mercury Engineering Corporation, Milwaukee, Wis., a corporation of Wisconsin Original No. 2,771,011, dated November 20, 1956, Serial No. 381,355, September 21, 1953. Application for reissue November 17, 1958, Serial No. 775,094

5 Claims. (Cl. 93—93)

Matter enclosed in heavy brackets [ ] appears in the original patent but forms no part of this reissue specification; matter printed in italics indicates the additions made by reissue.

The invention relates to carton or box blank forming machines and more particularly to finished blank counting mechanism.

The general object of the invention is to provide mechanism for counting finished blanks in batches of predetermined numbers as the blanks are carried along their delivery conveyor.

The invention further consists in the several features hereinafter set forth and more particularly defined by claims at the conclusion hereof.

Figure 1:
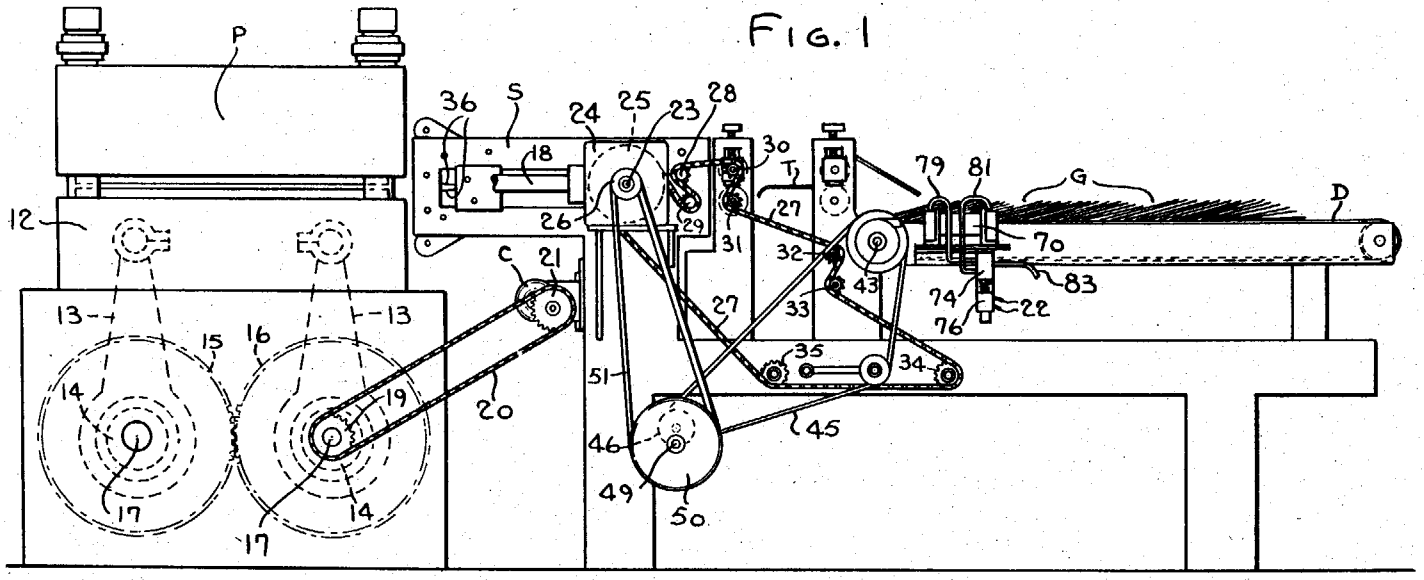
Fig. 1 is a side elevation view of a portion of a blank forming press equipped with a counting mechanism embodying the invention.
Figure 2:
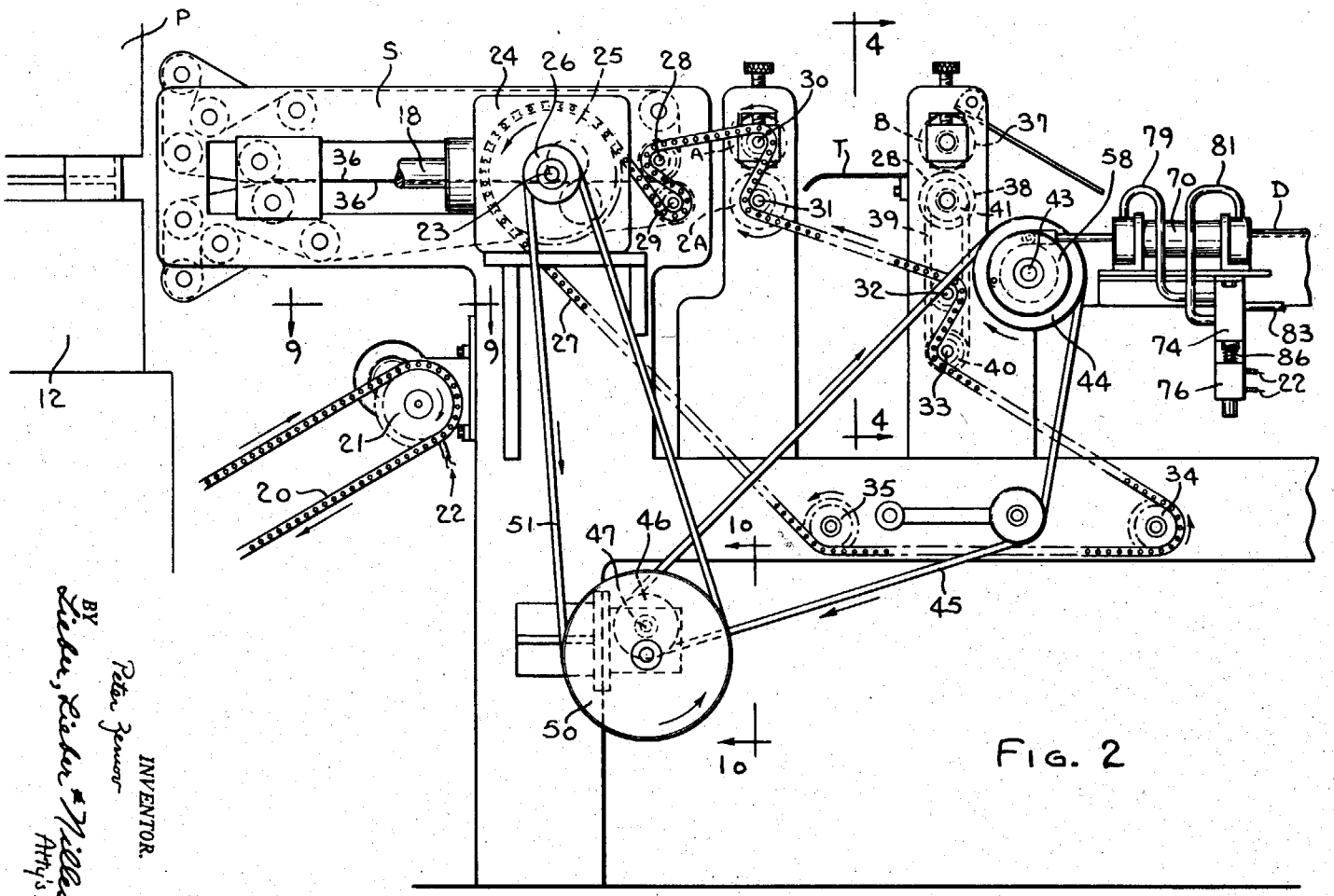
Fig. 2 is an enlarged view of parts shown in Fig. 1.

Referring to Figs 1 and 2 of the drawings, a blank forming press of the general type shown in United States Letters Patent No. 2,638,821, dated May 19, 1953, to John R. Baumgartner, for Blank Forming Feed Press, and the copending application of John R. Baumgartner, Serial No. 180,221, filed August 18, 1950, for Blank Forming Apparatus, now U. S. Patent No. 2,655,842, includes the blank forming press P, the stripper mechanism S, a set of feed rolls A and 2A, a second set of feed rolls B and 2B, and a delivery conveyor D.

As in Patent No. 2,638,821, the movable platen 12 of the press is reciprocated by connecting rods 13, mounted at their lower ends on eccentrics 14 which are operatively connected together by gears 15 and 16 mounted on shafts 17. One of the shafts 17 is suitably driven from an electric motor (not shown) and connected by drive connections (not shown) with a shaft 18. One of the shafts 17 carries a gear 19 connected by a chain 20 with a gear 21 on a drive shaft for a counter C so that each time the press P is operated the counter C will register a count. Counter C is of known construction and may be of any suitable predetermined count type settable to different predetermined counts and at the end of such count close an electric switch associated with the counter and in a control circuit 22.

The shaft 18 has a power take-off shaft 23 connected thereto through a gear box 24 and carries a sprocket 25 and a pulley 26. A chain 27 connects sprocket 25 with sprockets on conveyor drive shafts 28 and 29, sprockets on shafts 30 and 31 for the feed rolls A and 2A, sprockets on shafts 32 and 33 for the feed rolls B and 2B and guide sprockets 34 and 35. The stripper mechanism S includes a series of oppositely disposed sets of conveyor belts 36 which are driven from the shafts 28 and 29. Geared together feed rolls 37 and 38 are driven by belt 39 connecting a pulley 40 on the shaft 33 to a pulley 41 on the shaft for the roll 38.

With the arrangement thus far described the web of carton blank stock is cut into blanks by the press P. The blanks are advanced through the stripper mechanism S and carried along between the feed rolls A and 2A, over a table T and between the feed rolls B and 2B and by these rolls delivered as finished blanks to the delivery conveyor D.

The delivery conveyor D includes a drive roll 42 whose shaft 43 carries a pulley 44 connected by a belt 45 with a pulley 46 on the output shaft 47 of a gear box 48 whose input shaft 49 carries a pulley 50 connected by a belt 51 with the pulley 26. Thus the delivery conveyor D is driven in cyclic synchronism with the shaft 18 but at a reduced speed and also in synchronism with the counter C so that the counter C will act to count the number of finished carton blanks as they are carried along the conveyor D.

The relation of the counter drive to the drive for the delivery feed rolls B and 2B is such that each time the counter C registers one count, the rolls B and 2B will deliver a finished carton blank to the delivery conveyor D. Usually the speed of the delivery conveyor D is such that blanks are delivered to it, one at a time, in a closely spaced overlapping relation. According to the present invention, under the control of the counter controlled circuit 22 after a predetermined number of blanks have been delivered by the rolls B and 2B to the conveyor D, means are provided for momentarily speeding up the drive of the conveyor D so that a larger gap between predetermined numbers of blanks on the conveyor will occur, thus in effect separating the delivered blanks into a number of batches of counted blanks that may be removed by the operator as such from the conveyor so that these batches may be totalized and hence the number of blanks delivered in any run of the press ascertained.

Figure 11:
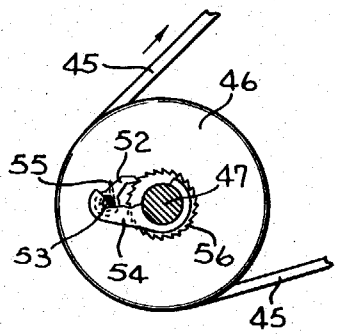
Fig. 11 is a detailed vertical sectional view taken on the line 11—11 of Fig. 10.
Figure 10:
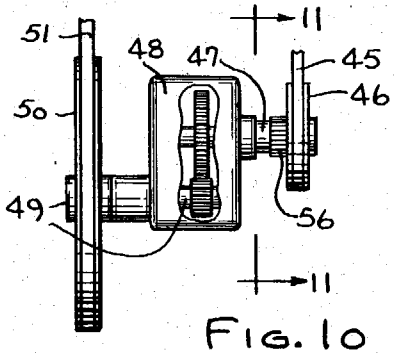
Fig. 10 is a detailed sectional view taken on the line 10—10 of Fig. 2.
Figure 9:
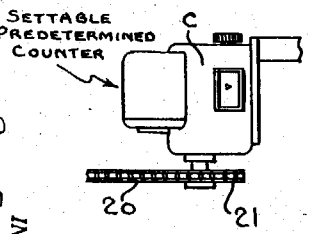
Fig. 9 is a plan view of the counter indicated in Figs. 1 and 2.

The means for momentarily speeding up the drive of the conveyor D includes means superimposed on the normal conveyor drive for speeding up the movement of the conveyor without interfering with said normal drive. This superimposed means for speeding up the movement of the conveyor D includes means for imparting a quick angular advance to the shaft 43 for the drive roll 42 of the conveyor. To permit this angular advance means to function, the pulley 46 has an overdrive connection with the shaft 47. The overdrive connection between pulley 46 and shaft 47 is shown in Fig. 11 as a ratchet dog 52 pivotally mounted at 53 on an arm 54 pinned to the shaft 47 and normally urged by a spring 55 into engagement with a ratchet wheel 56 carried by the pulley 46 so that the pulley 46 will be turned by the shaft 47 through its ratchet connection therewith or can be turned independently of said shaft.

Figure 5:
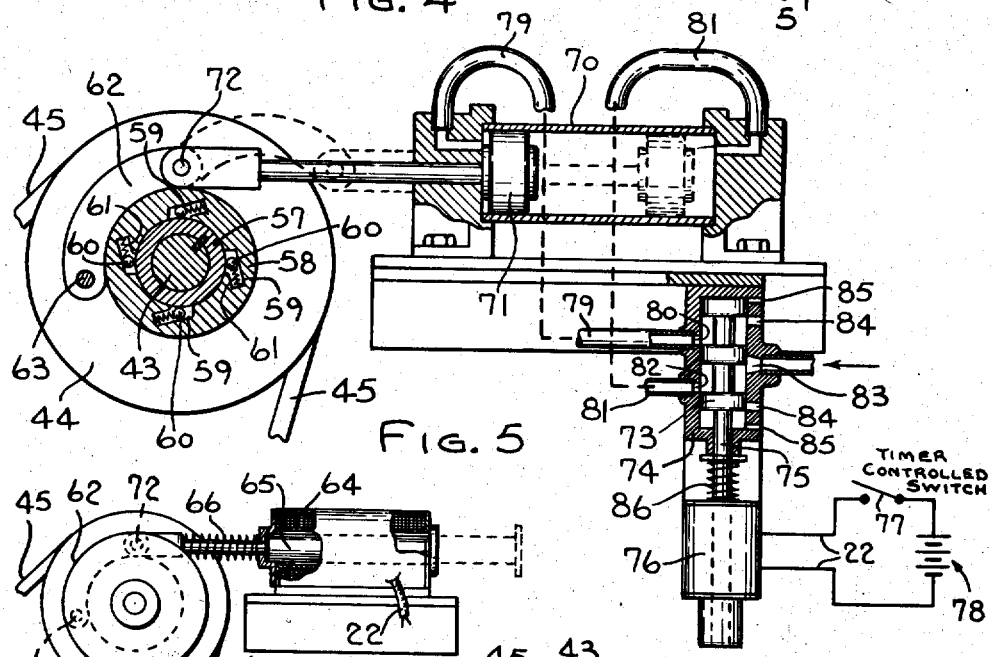
Fig. 5 is a detailed vertical sectional view taken on the line 5—5 of Fig. 4.

The means for imparting a quick angular advance to the shaft 43 includes a pulling means whose operation is controlled by the control circuit 22 and a clutch connection between said pulling means and said shaft. In Fig. 5 the clutch connection for the pulling means includes the hub 57 of the pulley 44 which is secured to the shaft 43, a clutch disk 58 loosely mounted on the shaft 43 and having recesses with wedge surfaces 59 therein in which balls or rollers 60 are mounted and normally urged against the hub 57 by springs 61 whereby as the shaft 43 is revolved by the pulley 44, the balls can slip relative to the hub, but when the disk 58 is revolved in the same direction as the pulley 44 but at a faster rate, the balls or rollers 60 will be wedged between the surfaces 59 and the hub 57 so that the disk 58 will then act to turn the shaft 43 in the same direction as its normal drive but at a faster rate. To turn the disk 58 as above described, it has a stirrup or link 62 pivotally connected thereto at one end by a pin 63 and at its other end is operatively connected to the pulling means.

Figure 6:
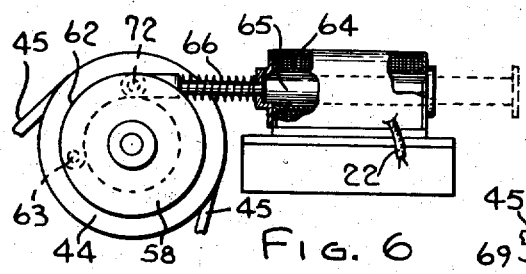
Fig. 6 is a side elevation view showing certain modifications, parts being broken away and parts being shown in section.
Figure 8:
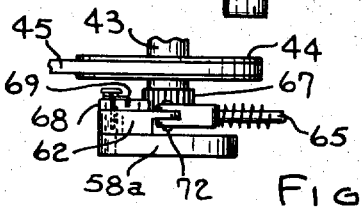
Fig. 8 is a plan view of parts shown in Fig. 7.
Figure 7:
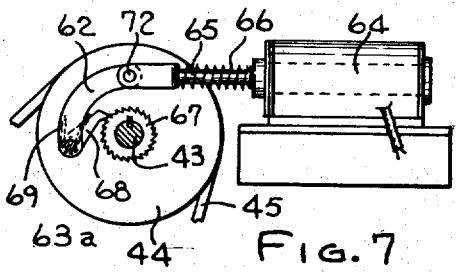
Fig. 7 is a view similar to Fig. 6 showing another modification.

In Fig. 5 the pulling means is an air motor, a control valve for said motor, and a timer controlled solenoid for operating said control valve. In Figs. 6 and 7 the pulling means is a solenoid whose coil 64 is energized by the timer controlled circuit 22 and whose plunger 65 is direct connected to the link 62, the plunger being returned by a spring 66. In Fig. 6 the one way clutch is the same as that shown in Fig. 5 while in Fig. 7 the one way clutch has been simplified by providing a ratchet wheel 67 on the shaft 43 and a pivoted pawl 68 urged by a spring 69 into engagement with said wheel and pivoted on the pin 63a on which the other end of the link 62 is pivotally mounted, said pin being carried by a disk 58a, loose on the shaft 43.

Referring to Fig. 5, the air motor includes an air cylinder 70 having a piston 71 mounted to reciprocate therein and whose rod is pivotally connected by a pin 72 to the link 62. The control valve for this motor is a piston valve 73 mounted in a valve housing 74 and direct connected to the plunger 75 of a solenoid whose coil 76 is energized by the timer controlled control circuit 22 which includes the timer controlled switch 77 and a source of current 78. A pipe 79 connects one of the cylinders 70 with a port 80 and a pipe 81 connects the other end of the cylinder with a port 82 in the valve housing which also has an inlet port 83 connected with a suitable pressure source of compressed air, relief or exhaust ports 84, and leakage relief ports 85. The valve 73 controls passage of the pressure air from the port 83 to either of the ports 80 or 82 and the release of air from either of the ports 80 or 82 through the associated relief port 84. Fig. 5 shows the valve 73 in its "off" position to which it has been moved by a spring 86 acting on the plunger 75, the pipe 79 and its port 80 being then connected with its relief port 84 while the pipe 81 and port 82 are connected with the inlet port 83. When after a predetermined count the counter C closes the switch 77, the coil 76 is energized to pull the plunger 75 and valve 73 down to "on" position and connect port 80 with inlet port 83 and port 82 with its relief port 84 so that compressed air is then introduced into the left hand end of the cylinder 70 to move the piston 71 to its dotted line position and thus act through the link 62 to angularly advance the shaft 43 and its conveyor roll 42 in the same direction as the feed but at a faster rate.

Similarly, the energization of the coil 64 in Figs. 6 and 7 will produce a quick momentary pull on the shaft 43 to angularly advance said shaft and the conveyor roll 42 in the direction of its movement by the belt 45 but at a faster rate.

Figure 3:
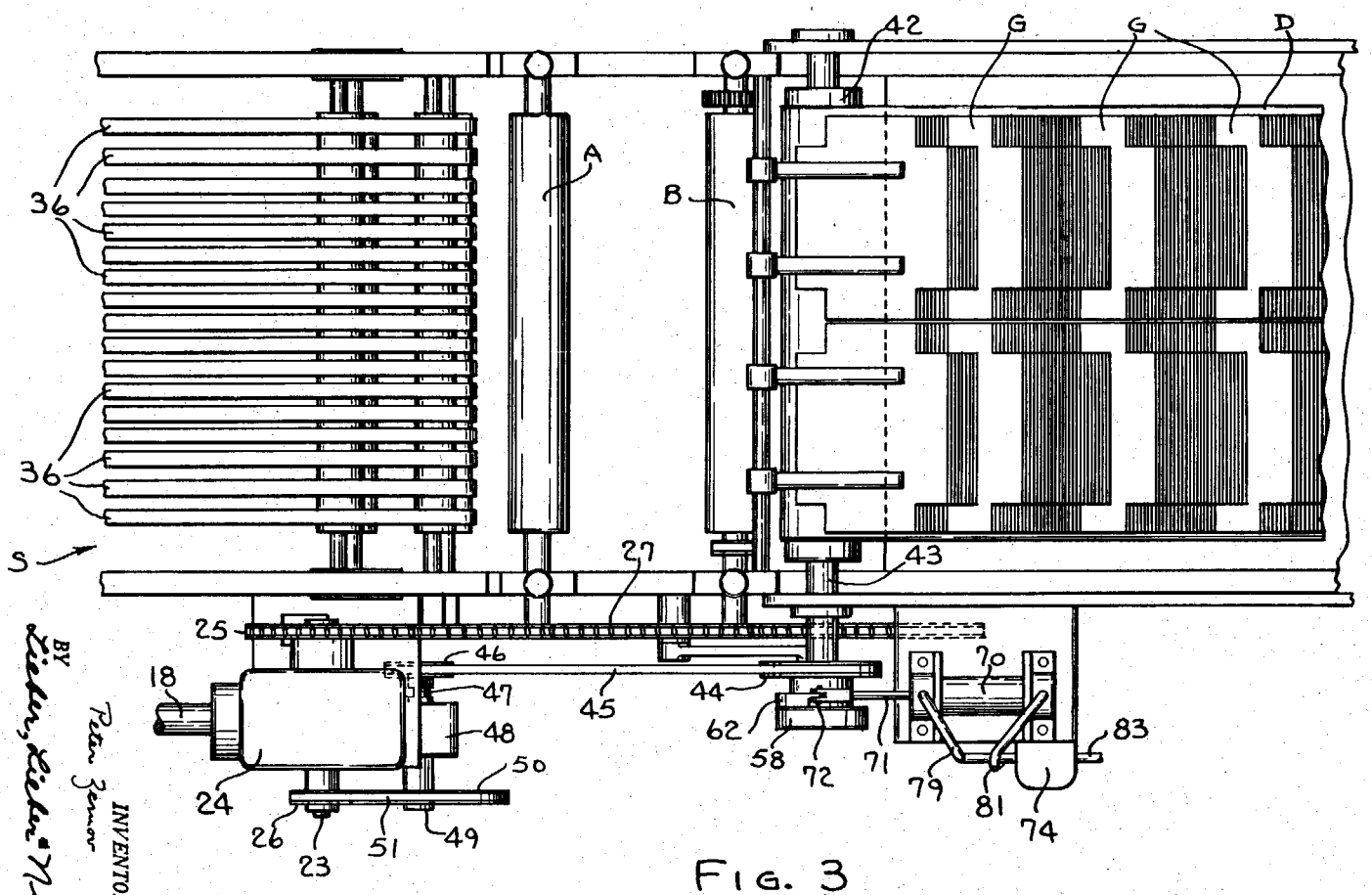
Fig. 3 is a plan view of parts shown in Fig. 2.
Figure 4:
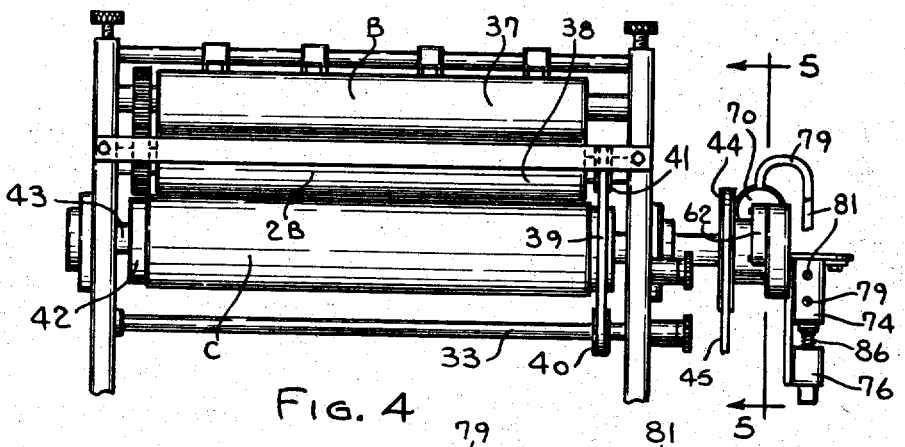
Fig. 4 is a detailed vertical sectional view taken on the line 4—4 of Fig. 2.

Thus in each instance, depending upon the setting of the counter C, after a predetermined number of finished blanks have been advanced in closely spaced relationship by the drive of the conveyor D from the belt 45, the closing of the switch 77 puts the pulling means above described into operation to momentarily increase the speed of the conveyor D so that the counted batch of blanks are separated from the oncoming blanks by a larger space or gap G as shown in Fig. 3 so that the finished blanks may be readily removed by the operator from the machine as counted batches of blanks. Fig. 3 of the drawings shows the spacing of the separated batches as being at least twelve times greater than the spacing of individual blanks of a batch relative to each other. In actual practice the spacing is much greater.

I desire it to be understood that this invention is not to be limited to any particular form or arrangement of parts except in so far as such limitations are included in the claims.

What I claim as my invention is:

[1. In a carton blank forming apparatus, the combination of an endless delivery conveyor for finished blanks, means for supplying said blanks to said conveyor at a rate to produce a closely overlapped relation of blanks thereon, means for continuously driving said conveyor to advance the finished blanks along the same including an overrunning clutch, a settable predetermined number type counter, means for driving said counter, means distinct from said first named driving means for moving said conveyor for a brief interval at a rate many times faster than and in the same direction as said first named drive means to produce a wide separation of finished blanks on said conveyor into batches, and means controlled by said counter to bring said second named conveyor moving means into operation at the end of a predetermined count of said counter to provide a predetermined number of blanks in each separated batch of blanks.]

[2. In a carton blank forming apparatus, the combination of an endless delivery conveyor for finished blanks, means for supplying said blanks to said conveyor at a rate to produce a closely overlapped relation of blanks thereon, means for continuously driving said conveyor to advance the finished blanks along the same including an overrunning clutch, a settable predetermined counter, means for driving said counter, means distinct from said conveyor driving means for intermittently driving said conveyor at a faster rate than and in the same direction as said first named drive means to produce a wider separation of finished blanks from each other to provide an easily detected batch of closely spaced blanks, and electrical controlled means controlled by said counter to bring said second named conveyor moving means into operation at the end of a predetermined count of said counter to provide a predetermined number of blanks in each separated batch of blanks.]

[3. In a carton blank forming apparatus, the combination of an endless conveyor for the finished blanks, means for continuously driving said conveyor to advance the finished blanks along the same including a continuously rotating feed roll, a settable predetermined number type counter, means for driving said counter, a separate power source, means operated by said separate power source for imparting an angular advance to said feed roll in the same direction as its rotation but at a faster rate than said first named drive means to speed up the movement of said conveyor to produce a separation of finished blanks on said conveyor into readily separable batches including a one way clutch, overdrive means permitting operation of said angular advance means without stopping the operation of said conveyor driving means, and means controlled by said counter for controlling said power source to bring said angular advance means into operation at the end of a predetermined count of said counter to provide a predetermined number of blanks in each separated batch of blanks.]

4. In a carton blank forming apparatus, the combination of an endless delivery conveyor for finished blanks, means for continuously driving said conveyor to advance the finished blanks along the same including a continuously rotating feed roll and an overrunning clutch, a settable predetermined number type counter, means for driving said counter, an angularly movable member, a one way clutch connection between said member and the shaft for said roll, a reciprocatory member, a link operatively connecting said reciprocatory member with said angularly movable member, a separate power source for said reciprocatory member to effect movement of said link, angular member and clutch to move said feed roll at a rate several times faster than the normal movement of said roll by said drive means and in the same direction to speed up the movement of said roll to produce a separation of blanks on said conveyor into readily separated batches, and means controlled by said counter to control said separate power source to provide batches of blanks of predetermined number.

5. In a carton blank forming apparatus, the combination of an endless delivery conveyor for finished blanks, means for continuously driving said conveyor to advance the finished blanks along the same including a continuously rotating feed roll and a clutch permitting overdrive of said feed roll, a settable predetermined number type counter, means for driving said counter, an angularly movable member, a one way clutch connection between said member and the shaft for said roll, an actuator for said movable member to effect an angular advance thereof [of at least ninety degrees], an air motor for said actuator and hence said feed roll to move the same at a rate many times faster than the normal rate of movement of said roll by said drive means and in the same direction to speed up the movement of said roll to produce a wide separation of blanks on said conveyor into readily separated batches, and a control for said air motor controlled by said counter to provide batches of blanks of predetermined number.

*6. In a carton blank forming apparatus, the combination of an endless and substantially horizontally disposed delivery conveyor for finished blanks, feed roll means for supplying said blanks to said conveyor at a rate to produce a partially overlapped relation of blanks thereon, means for continuously driving said conveyor to advance the finished blanks along the same including a continuously rotating feed roll and a clutch permitting overdrive of said feed roll, a settable predetermined number type counter, means for driving said counter, an angularly movable member, a one way clutch connection between said member and said roll, an air motor for said member and hence said feed roll to move the same at a rate faster than the normal rate of movement of said roll by said drive means and in the same direction to speed up the movement of said roll to produce a wide separation of blanks on said conveyor into readily separated but partially overlapped batches, and a solenoid-operated valve for said air motor actuated by said counter to provide batches of blanks of predetermined number.*

*7. In a carton blank forming apparatus, the combina- of a substantially horizontally disposed conveyor having an upper flight for finished blanks, means for supplying said blanks to said flight at a rate to produce a partially overlapped relation of blanks thereon, means for continuously driving said conveyor to advance the finished blanks along the same including an overrunning clutch, a settable predetermined number type counter, means for driving said counter, an air motor for moving said conveyor for a brief interval at a rate faster than and in the same direction as said first named drive means to produce a wide separation of finished blanks on said flight into batches, and means controlled by said counter to bring said motor into operation at the end of a predetermined count of said counter to provide a predetermined number of blanks in each separated batch of blanks.*

*8. In a carton blank forming apparatus, the combination of an endless and substantially horizontally disposed delivery conveyor for finished blanks, feed rolls for supplying said blanks to said conveyor at a rate to produce a partially overlapped relation of blanks thereon, drive means for continuously driving said conveyor to advance the finished blanks along the same including a continuously rotating feed roll and an overrunning clutch, a settable predetermined number type counter, means for driving said counter, an angularly movable member, a one way clutch connection between said member and said roll, an extensible motor connected with said member, a separate power source for said motor to effect movement of said member and clutch to move said feed roll at a rate several times faster than the normal movement of said roll by said drive means and in the same direction to speed up the movement of said roll to produce a separation of blanks on said conveyor into readily separated and partially overlapped batches, a valve for controlling said motor, and solenoid means connected to said valve and actuated by said counter to actuate said motor to provide batches of blanks of predetermined number.*

References Cited in the file of this patent or the original patent

UNITED STATES PATENTS

| | | |
|---|---|---|
| 1,232,422 | Halvorsen | July 3, 1917 |
| 1,998,572 | Dewsberry | Apr. 23, 1935 |
| 2,585,076 | Bandura et al. | Feb. 12, 1952 |
| 2,629,300 | Smith | Feb. 24, 1953 |